UNITED STATES PATENT OFFICE.

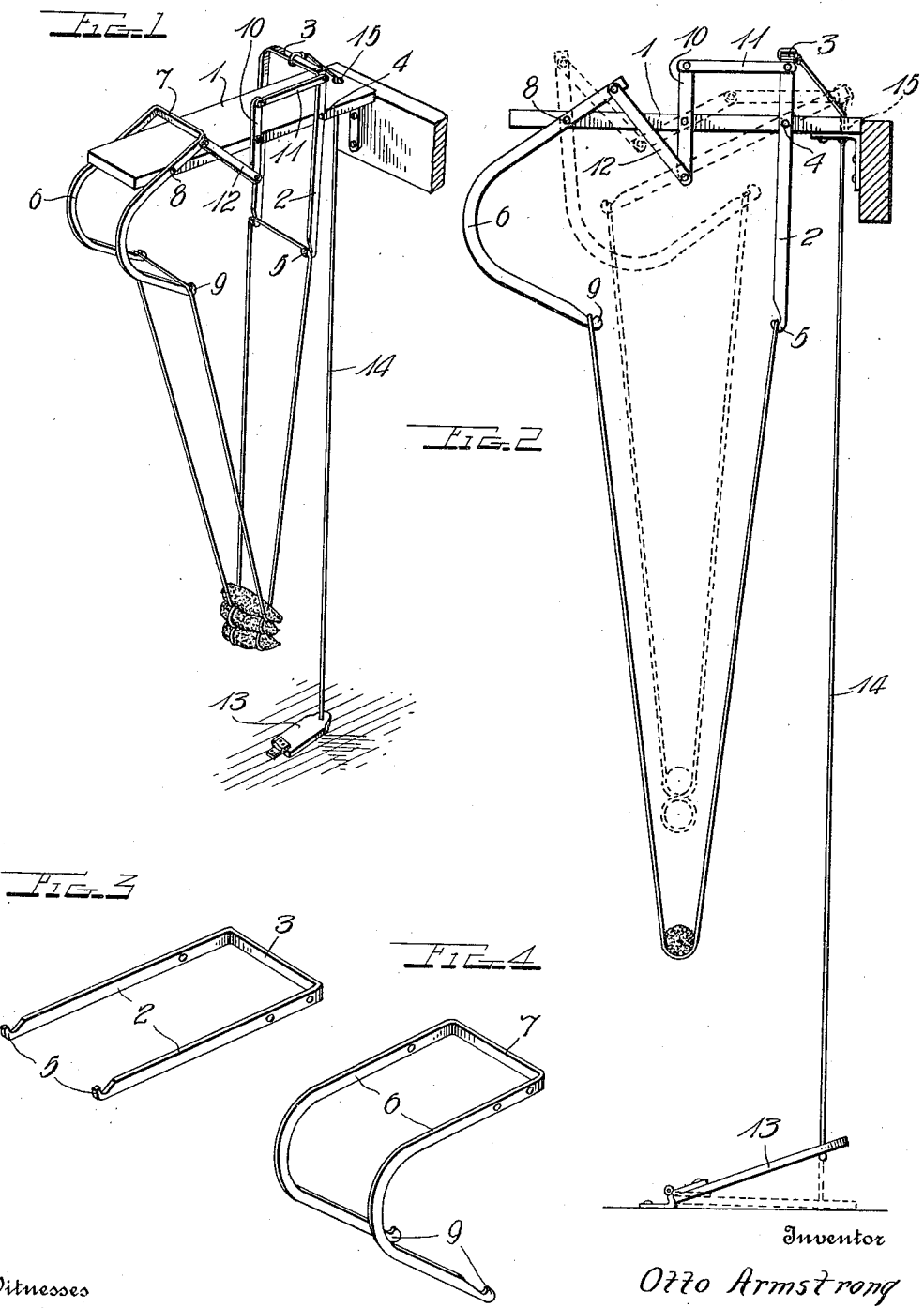

OTTO ARMSTRONG, OF OTTUMWA, IOWA.

DEVICE FOR STRINGING SEED-CORN.

1,069,595.  Specification of Letters Patent.  Patented Aug. 5, 1913.

Application filed February 3, 1913. Serial No. 745,986.

*To all whom it may concern:*

Be it known that I, OTTO ARMSTRONG, a citizen of the United States, residing at Ottumwa, in the county of Wapello and State of Iowa, have invented certain new and useful Improvements in Devices for Stringing Seed-Corn; and I do declare the following to be a full, clear, and exact description of the invention, such as will enable others skilled in the art to which it appertains to make and use the same.

This invention relates to improvements in devices for stringing seed corn.

One object of the invention is to provide a device of this character by means of which ears of seed corn may be fastened together or strung one above the other on a flexible connecting element, said element forming the means for suspending the ears from any suitable support while drying.

Another object is to provide a device of this character adapted to be actuated by the foot of the operator thus leaving the hands free for rapidly placing the ears in position to be strung.

With these and other objects in view, the invention consists of certain novel features of construction, and the combination and arrangement of parts as will be more fully described and claimed.

In the accompanying drawings: Figure 1 is a perspective view of the invention arranged for use; Fig. 2 is a side view thereof showing in full and dotted lines the manner in which the same is used; Fig. 3 is a detail perspective view of one of the twine carrying members; Fig. 4 is a similar view of the other twine carrying member of the device.

In the embodiment of the invention I provide an overhead supporting bracket 1 which is secured at the proper elevation to any suitable support and to which near its inner end is secured an inner twine carrying member 2 comprising parallel arms connected at their upper ends by an integral cross bar 3. The side arms are spaced a suitable distance to pass astride of the bracket 1 to which they are pivotally connected near their upper ends as shown at 4. When thus arranged the connected upper ends of the arms project a suitable distance above the bracket while the lower longer ends of the arms extend downwardly and have formed on their lower ends twine engaging hooks 5.

Spaced a suitable distance from the inner twine carrying member 2 is an outer twine carrying member 6 comprising a pair of curved parallel arms which are spaced a distance corresponding with the width of the bracket 1 and which are connected at their upper ends by an integral cross bar 7. The arms of the member 6 are pivotally connected near their upper ends as at 8 to the side edges of the bracket 1 near the outer end thereof and the connected upper ends of said arms project a suitable distance above the bracket as shown. On the lower ends of the arms of the member 6 are formed twine engaging hooks 9 which coact with the hooks 5 of the arms of the member 2 to carry the looped ends of the twine back and forth for binding or stringing the ears of corn therein.

Pivotally connected to one edge of the bracket 5 substantially midway between the inner and outer twine carrying members is a rock lever 10, the upper end of which is connected by a link 11 to the upper end of the adjacent arm of the inner member 2 while the lower end of said lever 10 is connected by a link 12 with the upper end of the adjacent bar of the outer member 6. By thus connecting the members it will be seen that when the member 2 is actuated to swing the lower ends of the arms thereof inwardly or outwardly, the outer member 6 will be simultaneously actuated for swinging the arms thereof in opposite directions, or, in other words, when the members are actuated in one direction the arms thereof will be swung toward and past each other and when actuated in the opposite direction the arms will be swung away from each other.

In order to leave the hands of the operator free for placing the ears of corn in position for being strung I preferably provide means whereby the twine carrying members may be actuated by the foot of the operator, said means comprising a treadle 13 which is pivotally connected at one end to the floor or other suitable support and at its opposite end is connected to the lower end of a cord or flexible element 14 which extends upwardly through an aperture 15 in the inner end of the bracket 1 and is connected with the cross bar on the upper ends of the arms of the member 2 as shown. By constructing and arranging the treadle 13 as herein shown and described it will be seen that when the latter is depressed by the foot of the operator the twine carrying member 2 will be actuated in the proper direction for swinging the arms thereof toward the twine carrying member 6 which will be simultaneously actuated through the lever 10 and the connecting links 11 and 12 to swing the arms of said member toward the member 2, the arms of said members crossing or passing each other as shown.

In order to permit the ends of the arms of the members 2 and 6 to clear or pass when swung toward each other, the arms of the member 6 are preferably spaced apart at their lower ends to a slightly greater distance than the arms of the member 2 thereby permitting said members to operate as described. Moreover the arms of the member 6 are curved outward or away from the member 2 as shown, with the result that when these members swing from the full-lined position to the dotted-lined position in Fig. 2 the hooks 5 pass over the hooks 9 and the entire member 2 passes up into the bent portion of the member 6 with the result that there can be no interference of members or cords, as the only place where the cords of one member pass the other is where they cross once as shown in dotted lines.

In the operation of the device a piece of twine or other flexible element of suitable length is provided and the ends thereof tied or otherwise connected. The opposite ends of the loop of twine are then engaged with the hooks 5 and 9 on the ends of the arms of the twine carrying members while the intermediate portion of the twine hangs downwardly between said members as shown. After the twine has been thus arranged and the members 2 and 6 actuated to swing the arms thereof outwardly or away from each other the first ear of corn is laid horizontally across or in the depending portion of the twine loop, after which the members 2 and 6 are actuated in the manner described to swing the ends of the arms inwardly and past each other thereby crossing or carrying the ends of the twine around the ear of corn. After the twine has thus been crossed the next ear of corn is laid above the first ear and into the crossed portions of the twine. When the second ear has thus been placed the weight of the ears will pull downwardly on the twine and will swing the ends of the arms outwardly thereby carrying the upper portion of the twine back and again crossing the same above the second ear. When the twine has thus been crossed the next ear is laid in engagement with the crossed ends of the twine and the treadle operated to again swing the ends of the arms toward and past each other to secure the last ear and provide a support for the next ear. As many subsequent ears as desired are successively strung one above the other in the same manner as described and as clearly illustrated in Fig. 2 of the drawings. When a sufficient number of ears have been strung the upper looped ends of the twine are disengaged from the hooks 5 and 9 on the ends of the twine carrying arms and said looped ends of the twine are then engaged with a suitable support from which the strung ears are suspended for drying.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

A device for stringing corn comprising a horizontal bracket, a U-shaped member having straight arms pivoted to the edges of said bracket and provided with hooks at their lower ends, a second U-shaped member having curved arms pivoted near their upper ends to said bracket and having hooks at their lower ends, a rock lever pivoted to one edge of the bracket, a link connecting one end of this lever with one member and another link connecting the other end of this member with the other lever, a treadle, and a cord connecting the treadle with one of said members, the length of the latter being such that the member having the straight arm swings past the hooks of the other member, for the purpose set forth.

In testimony whereof I have hereunto set my hand in presence of two subscribing witnesses.

OTTO ARMSTRONG.

Witnesses:
 FRANK CLARK,
 MICHAEL M. MIER.

Copies of this patent may be obtained for five cents each, by addressing the "Commissioner of Patents, Washington, D. C."